United States Patent
Bonanno et al.

(10) Patent No.: US 12,397,508 B2
(45) Date of Patent: Aug. 26, 2025

(54) 3D PRINTING SURFACE CALIBRATION

(71) Applicant: The Government of the United States of America, as represented by the Secretary of the Navy, Arlington, VA (US)

(72) Inventors: David Bonanno, Fairfax Station, VA (US); Blerta Markowski, Springfield, VA (US); Brian Hicks, Alexandria, VA (US); Freddie Santiago, Fort Washington, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 426 days.

(21) Appl. No.: 17/887,413

(22) Filed: Aug. 12, 2022

(65) Prior Publication Data
US 2024/0051230 A1   Feb. 15, 2024

(51) Int. Cl.
*B29C 64/393* (2017.01)
*B29C 64/268* (2017.01)
*B33Y 30/00* (2015.01)
*B33Y 50/02* (2015.01)

(52) U.S. Cl.
CPC .......... *B29C 64/393* (2017.08); *B29C 64/268* (2017.08); *B33Y 50/02* (2014.12); *B33Y 30/00* (2014.12)

(58) Field of Classification Search
CPC ... B29C 64/268; B29C 64/386; B29C 64/393; B33Y 30/00; B33Y 50/00; B33Y 50/02
See application file for complete search history.

(56) References Cited

U.S. PATENT DOCUMENTS

| | | | | |
|---|---|---|---|---|
| 5,182,715 A | * | 1/1993 | Vorgitch et al. | G06F 15/20 364/474.24 |
| 2004/0075659 A1 | * | 4/2004 | Taubin et al. | G06T 17/00 345/428 |
| 2017/0057170 A1 | * | 3/2017 | Gupta et al. | B29C 67/0088 |
| 2021/0302949 A1 | * | 9/2021 | Wu | B33Y 50/02 |

* cited by examiner

*Primary Examiner* — Tameem D Siddiquee
(74) *Attorney, Agent, or Firm* — US Naval Research Laboratory; William P. Ladd (57) ABSTRACT

Systems and methods are provided for achieving more accurate 3D printed parts than printed parts achieved by conventional means. The disclosed systems and methods reduce the need for tolerance fitting when designing 3D objects and manufacturing with stereolithographic 3D printers. Embodiments of the present disclosure enable fitted assemblies to be manufactured and produce accurate standoffs where size constraints are critical. Embodiments of the present disclosure realize these solutions without requiring modifications to the printer or the printer software.

20 Claims, 8 Drawing Sheets

3D PRINTING SURFACE CALIBRATION

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 109420-US1.

FIELD OF THE DISCLOSURE

This disclosure relates to printing, including printing three dimensional objects.

BACKGROUND

Computer aided design (CAD) software can be used to design objects to be printed using three-dimensional (3D) printers. Once a part has been designed in CAD, the model can then be converted into a file using a file format, such as the Standard Triangle Language (STL) file format, which describes a 3D object by approximating the surface using connected triangular faces. A second piece of software, often provided by the manufacturers of a particular 3D printer, can take the STL file and convert it into instructions which the 3D printer can use to create a physical object.

One such method of 3D printing, Stereolithographic (SLA) printing, creates objects from photopolymerizing resins. These resins are a liquid at room temperature but will turn into a solid when illuminated by ultraviolet light. SLA printers use intersecting ultraviolet laser light to accurately create complex parts by iteratively printing thin layers of material. The accuracy of SLA printing is limited by the beamwidth of the ultraviolet laser. This beamwidth is often small, on the order of 0.005 inches (5 mil) and not compensated for by the printer software. Because of this, well fitted parts, such as small bolts and nuts, are unable to be realized with conventional 3D printers.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure provide systems and methods for achieving more accurate 3D printed parts than printed parts achieved by conventional means. The disclosed systems and methods reduce the need for tolerance fitting when designing 3D objects and manufacturing with stereolithographic 3D printers. Embodiments of the present disclosure enable fitted assemblies to be manufactured and produce accurate standoffs where size constraints are critical. Embodiments of the present disclosure realize these solutions without requiring modifications to the printer or the printer software.

Figure 1:
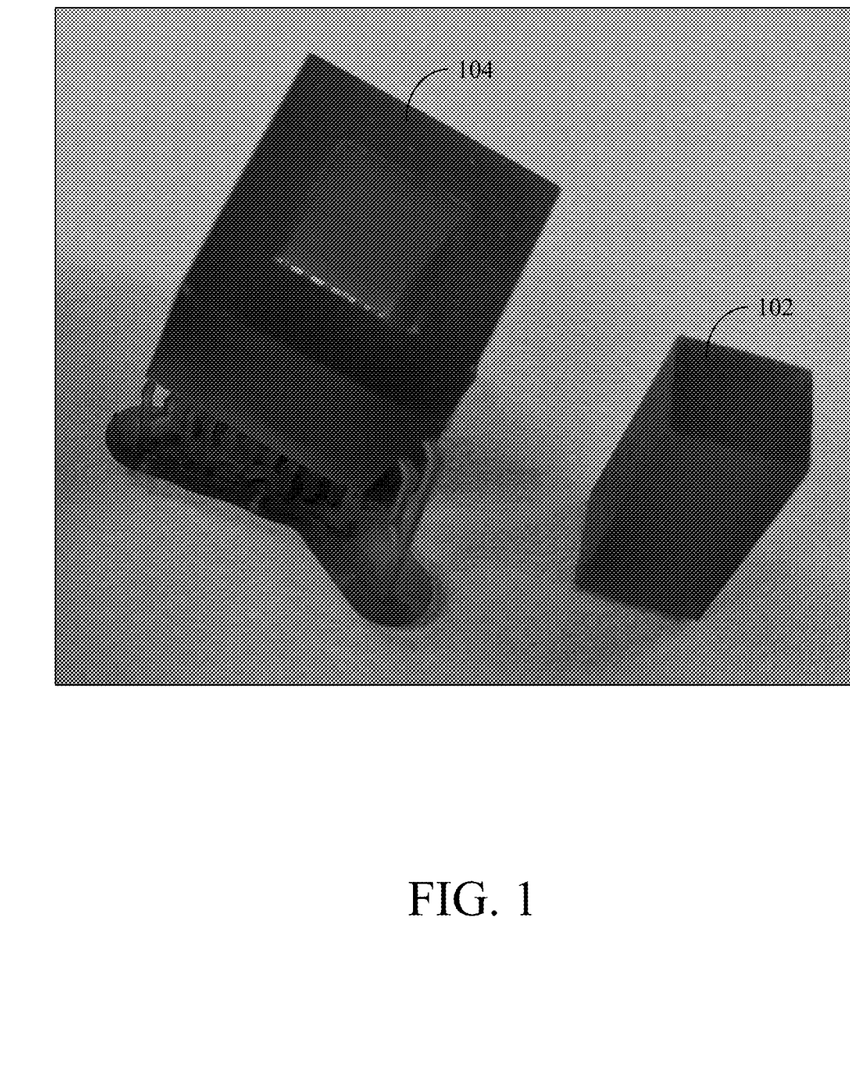
FIG. 1 is an image of an assembly involving a square peg object and a square hole object of the same size.

2. 3D Printing of Objects Requiring High Tolerances 3D printing enables rapid prototypes of parts which are useful for laboratory and field experimentation with minimal cost. Many parts require high tolerances including optical mounts, fitted assemblies, screws, etc. Current 3D printing systems and methods deposit extra material to surfaces, and an additive effect of these depositions causes current 3D printing systems and methods to fail to produce parts that satisfy these tolerances. Embodiments of the present disclosure provide systems and methods that account for these additive deposits, enabling 3D printing of parts that satisfy these high tolerances. FIG. 1 is an image of an assembly involving a square peg object 102 and a square hole object 104 of the same size. Current 3D printing techniques add material to external surfaces of peg object 102 and hole object 104. As such, when peg object 102 and hole object 104 are produced using current 3D printing techniques, peg object 102 will not fit into hole object 104.

Designing a part to be printed using a 3D printer that satisfies a high tolerance requires challenging designs that are aware of manufacturing defects. This can be especially problematic on complex designs like screw threads. Post manufacturing touch up can be used to modify a printed object, but this can require sanding, cutting, or eroding the outer surface of the material through chemical means. This post manufacturing touch up can be highly inaccurate, messy, and time consuming. Further, including offsets in the creation of the part itself can prove difficult for complex shapes where the normal surface would be hard to define.

Figure 2:
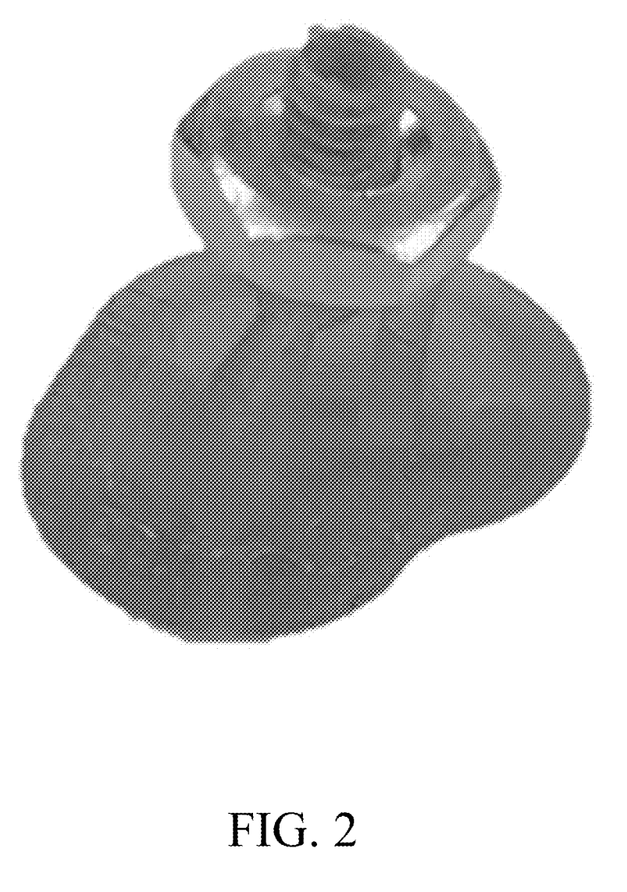
FIG. 2 is an image of a part containing small threads for a bolt that can be printed using a method in accordance with an embodiment of the present disclosure.

Using conventional techniques, small pieces, such as small threaded parts (e.g., 4-40 screws and bolts) are not realizable, and complex designs require considerable time-consuming redesigns dependent on the specific printer used. Embodiments of the present disclosure provide systems and methods that enable small threaded bolts (e.g., 4-40 pitch) to be realizable. For example, embodiments of the present disclosure enhance the design process (e.g., using an algorithm in an embodiment) to account for the additive surface layers encountered in the manufacturing processes. Systems and methods in accordance with embodiments of the present disclosure do not require the designer to add in tolerance for fitted parts, and can be completely transparent to the 3D printer's software. FIG. 2 is an image of a part containing small threads for a bolt that can be printed using a method in accordance with an embodiment of the present disclosure.

Figure 3A:
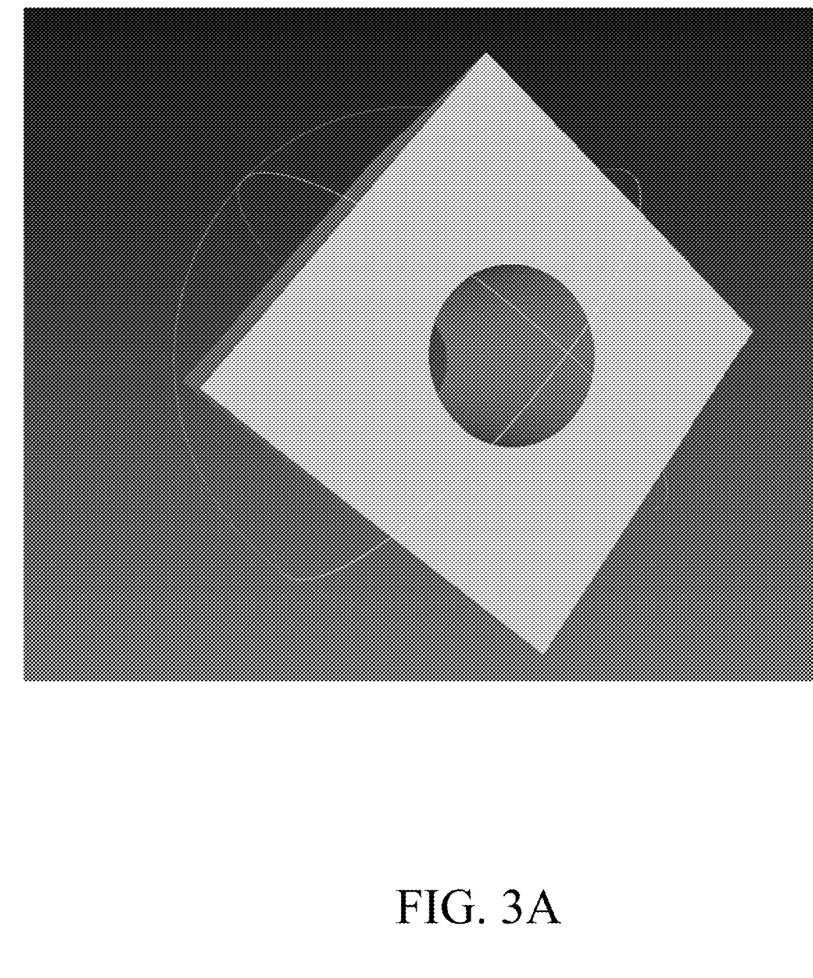
FIG. 3A is an image showing the design of a cube with a cylindrical hole.
Figure 3B:
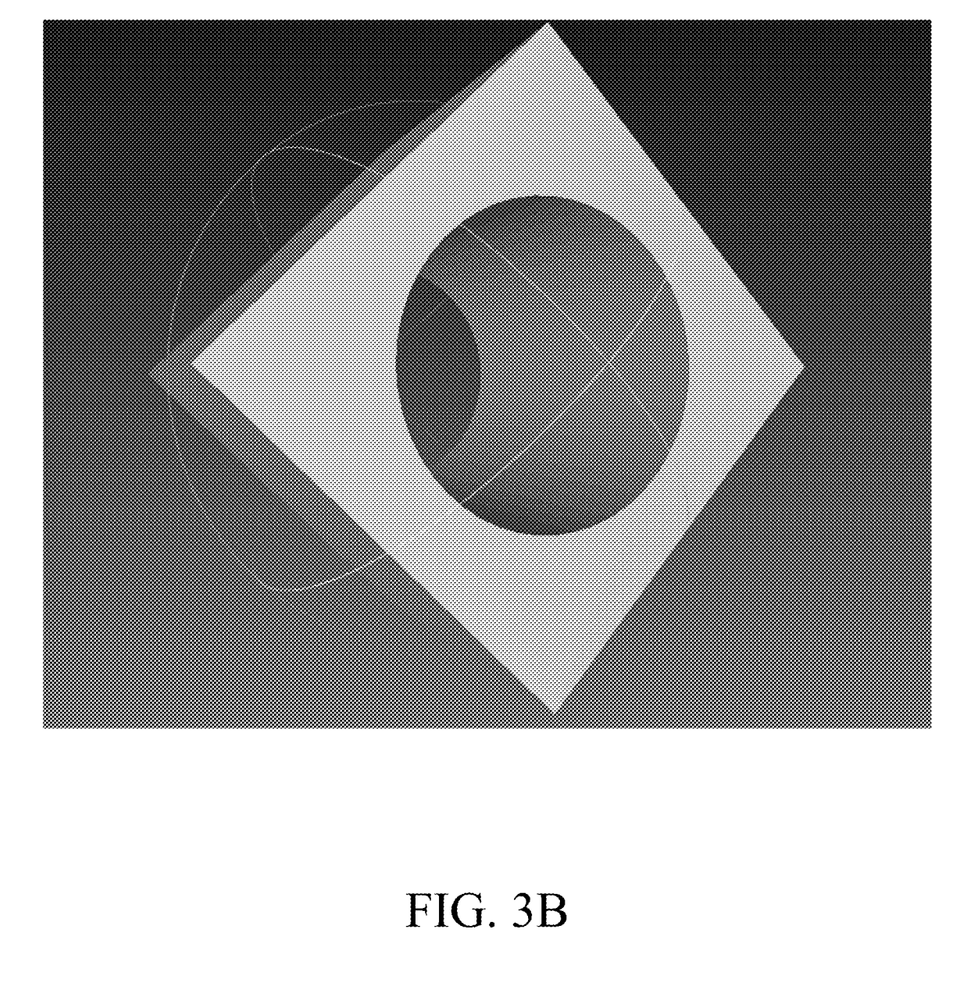
FIG. 3B is an image showing the results of eroding the cube of FIG. 3A using a method in accordance with an embodiment of the present disclosure that accounts for the additive surfaces caused by manufacturing without redesigning the part.

In an embodiment, a method for designing a 3D object in accordance with an embodiment of the present disclosure erodes 3D surfaces preemptively, effectively accounting for errors introduced in the manufacturing process. FIG. 3A is an image showing the design of a cube with a cylindrical hole. FIG. 3B is an image showing the results of eroding the cube of FIG. 3A using a method in accordance with an embodiment of the present disclosure that accounts for the additive surfaces caused by manufacturing without redesigning the part.

Figure 4:
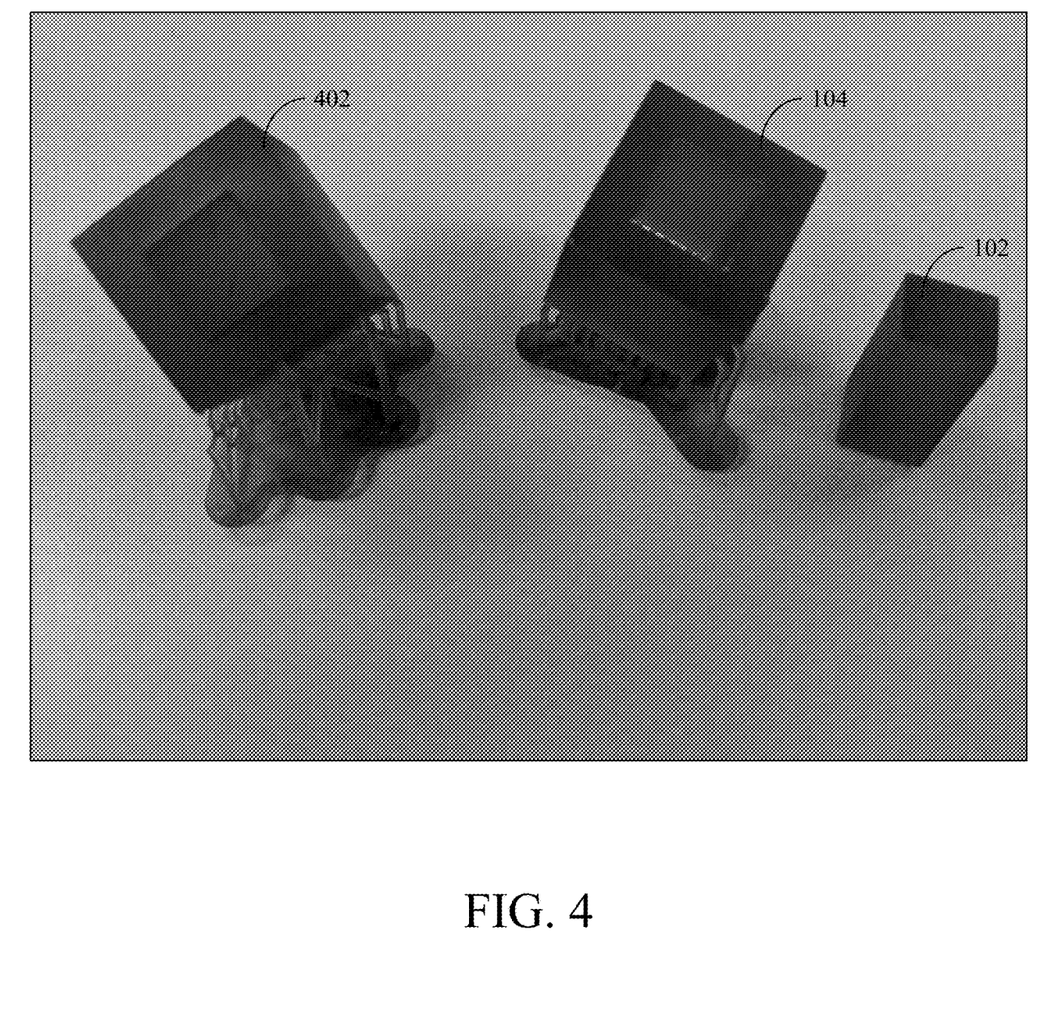
FIG. 4 is an image showing 3D parts that can be printed using systems and methods in accordance with embodiments of the present disclosure.

FIG. 4 is an image showing 3D parts that can be printed using systems and methods in accordance with embodiments of the present disclosure. FIG. 4 shows peg object 102 and hole object 104 from FIG. 1. When a new square hole object 402 is printed using a method in accordance with an embodiment of the present disclosure that erodes 3D surfaces of hole object 402 preemptively, effectively accounting for errors introduced in the manufacturing process, peg object 102 can now fit snugly into hole object 402 without requiring any modification to the original CAD design of peg object 102 or hole object 402.

Embodiments of the present disclosure enable precision assemblies to be rapidly designed and manufactured without requiring any additional workload on the designer and allow the manufacturing of smaller and more complex designs. Embodiments of the present disclosure facilitate the creation of higher accuracy parts created with 3D printers, such as SLA 3D printers. This enables fitted parts, including nuts and bolts, to be reliably created using these printers. Embodiments of the present disclosure can exist outside of other software packages and would not need to be included in either CAD or the 3D printer control software. Embodiments of the present disclosure can be applied to 3D object files, such as STL files, without the need for additional software integration and testing. Because of this, embodiments of the present disclosure can operate with any 3D printer (e.g., a SLA printer).

3. Exemplary Systems for Calibrating Surfaces of a 3D Object

As discussed above, the effects of the beamwidth of a laser in SLA printing can add a small deposit to exterior surfaces equal to half the beamwidth of the laser. Embodiments of the present disclosure can use files generated by CAD software, such as STL files, and modify these files to effectively erode surfaces, thereby compensating for the beamwidth of the laser in an SLA printer.

For example, the STL files generated by CAD software define two parameters: vertexes and faces. Vertexes are defined as a list of N points in Cartesian 3D space. Each vertex is a sequence of real numbers: (X, Y, Z). Similarly, the faces define triangular surfaces formed by connecting three vertexes in a sequence of integers corresponding to three vertexes: (A, B, C). These three vertexes form a triangular surface, and the surface's normal vector is defined by using the right-hand rule establishing an 'up' vector for each surface in the STL file.

In an embodiment, a 3D surface calibrator in accordance with an embodiment of the present disclosure can loop through all of the vertexes in the STL file to determine each vertex. Next, in an embodiment, the 3D surface calibrator can determine all of the associated faces that connect to each vertex and each face's normal vector. The 3D surface calibrator can then average together all of the normal vectors and multiply them by a scalar to create an offset vector. In an embodiment, this scalar value is minimally half the beamwidth of the laser, though it is possible to use other (e.g., larger) scale values depending on the fit tolerance determined by the designer. If the beamwidth of the laser is unknown, the offset scalar value can be measured from a test print of known dimensions, such as a cube. Once the offset vector is calculated, the 3D surface calibrator can generate an updated location for each vertex by adding the offset vector to the vertex.

In an embodiment, once this process has been applied to all vertexes, the 3D surface calibrator can generate a calibrated STL file using the updated vertex locations and the unaltered faces. In an embodiment, the total number of vertexes, as well as their indexes, are unaltered in this process. This file can then be used by a 3D printer to create an object that matches the size of the original STL model, effectively removing the effect of the beamwidth of the laser.

Figure 5A:
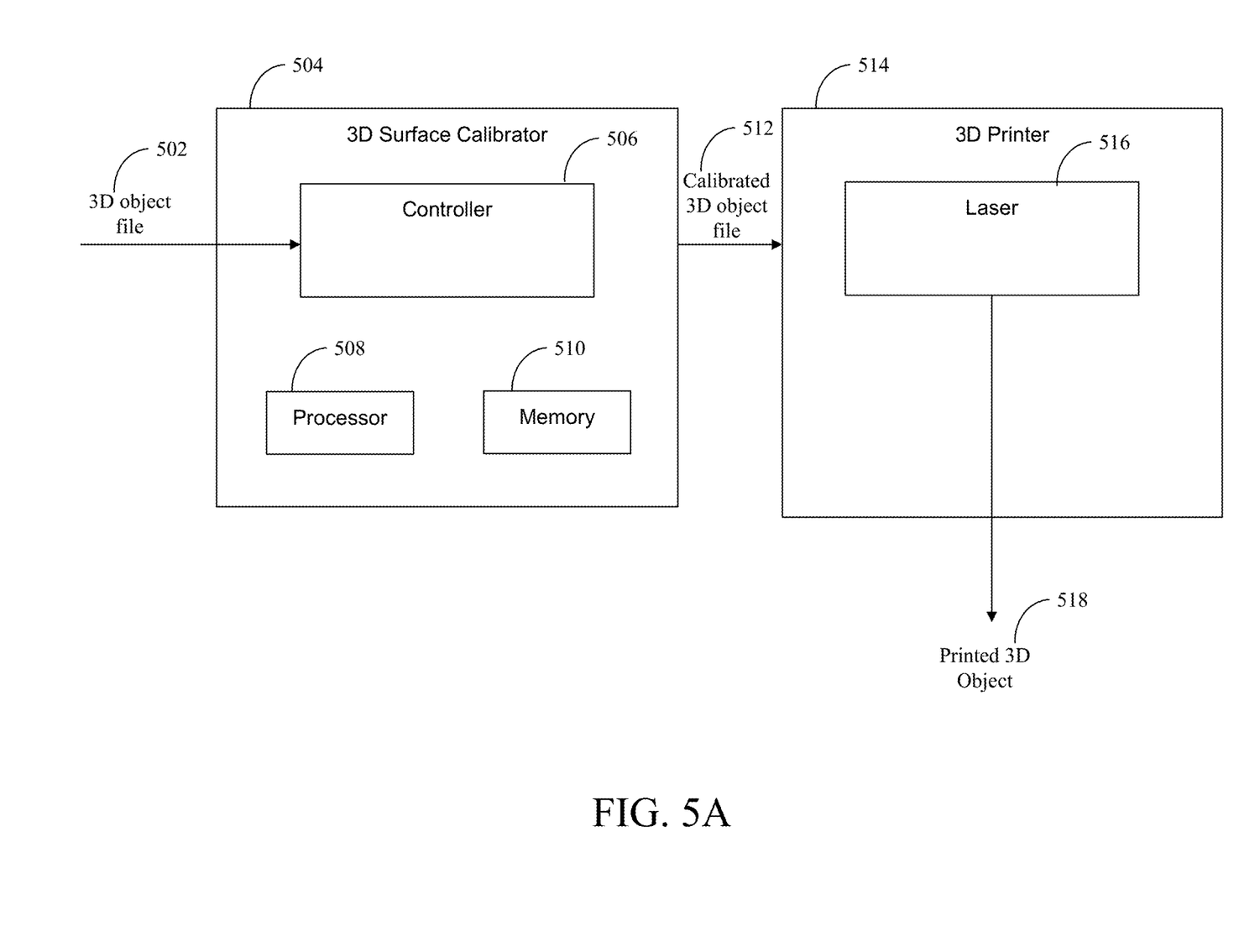
FIG. 5A is a diagram of an exemplary system for calibrating surfaces of a 3D object in accordance with an embodiment of the present disclosure.

FIG. 5 is a diagram of an exemplary system for calibrating surfaces of a 3D object in accordance with an embodiment of the present disclosure. In FIG. 5, a 3D surface calibrator 504 in accordance with an embodiment of the present disclosure includes a controller 506, a processor 508, and a memory 510. In FIG. 5, 3D surface calibrator 504 receives a 3D object file 502, such as an STL file. In an embodiment, controller 506 of 3D surface calibrator can calibrate 3D object file 502. For example, in an embodiment, controller 506 can determine vertexes and faces in 3D object file 502, determine a normal vector for each face, determine an offset vector based on the determined normal vectors, determine updated locations for each vertex based on the determined offset vector, and generate a calibrated 3D object file 512 based on the determined updated locations for each vertex.

In an embodiment, 3D surface calibrator 504 can send calibrated 3D object file 512 to 3D printer 514, which includes laser 516. In an embodiment, 3D printer 514 uses calibrated 3D object file 512 and laser 516 to generate a printed 3D object 518. In an embodiment, controller 506 of 3D surface calibrator 504 can determine the offset vector based on the beamwidth of laser 516. In an embodiment, laser 516 adds a small deposit to exterior surfaces equal to half the beamwidth of laser 516, and controller 506 of 3D surface calibrator 504 compensates for this deposit by applying the determined offset vector to each vertex in 3D object file 502.

In an embodiment, the beamwidth of laser 516 (and/or the offset scalar value used to determine the offset vector) is known by controller 506, and controller 506 determines that the offset scalar value is equal to half the beamwidth of laser 516. In an embodiment, the beamwidth of laser 516 (and/or the offset scalar value used to determine the offset vector) is not known by controller 506, and controller 506 can send a prompt to a user to enter the beamwidth of laser 516 and/or the offset scalar value used to determine the offset vector. In an embodiment, controller 506 can receive information regarding the beamwidth of laser 516 from 3D printer 514 (e.g., in response to a request sent to 3D printer 514 and/or using a sensor connected to 3D printer 514).

In an embodiment, controller 506 can send a request to 3D printer 514 to print a 3D object for use in determining the offset scalar value used to determine the offset vector. For example, in an embodiment, controller 506 can send 3D object file 502 to 3D printer 514. In an embodiment, once printed 3D object 518 is printed by 3D printer 514, an offset scalar value used to determine the offset vector can be determined based on measuring undesired deposits to exterior surfaces of printed 3D object 518. For example, in an embodiment, a human user can measure these deposits, determine the desired offset scalar value, and input the desired offset scalar value to 3D surface calibrator 504.

Figure 5B:
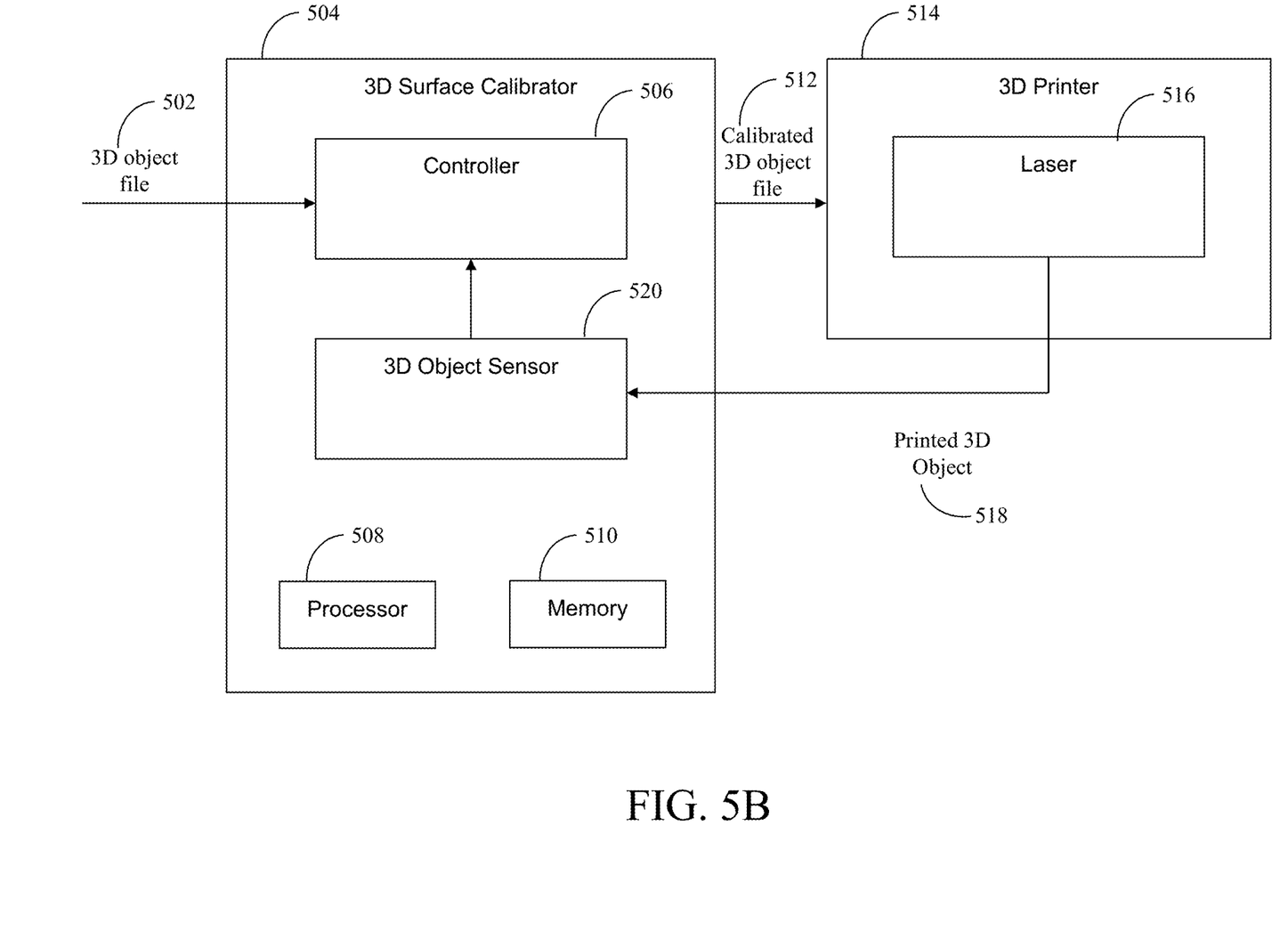
FIG. 5B is a diagram of another exemplary system for calibrating surfaces of a 3D object in accordance with an embodiment of the present disclosure.

In an embodiment, controller 506 can determine the offset scalar value based on printed 3D object 518. FIG. 5B is a diagram of another exemplary system for calibrating surfaces of a 3D object in accordance with an embodiment of the present disclosure. In FIG. 5B, 3D surface calibrator 504 includes a 3D object sensor 520, and printed 3D object 518 can be input to 3D object sensor 520 (e.g., by manually transferring printed 3D object 518, by mechanically moving printed 3D object 518 to 3D object sensor 520, by integrating 3D object sensor 520 into the output tray of 3D printer 514, etc.). In an embodiment, 3D object sensor 520 can sense and/or scan printed 3D object 518 and can send the sensed and/or scanned information to controller 506 for use in determining the offset scalar value to be applied. In an embodiment, once the offset scalar value corresponding to 3D printer 514 has been determined, the same offset scalar value can be applied to subsequent files sent to 3D printer 514. In an embodiment, 3D surface calibrator can continually determine, adjust, and/or refine offset scalar values to be applied (e.g., using 3D object sensor 520) as 3D objects are continually printed by 3D printer 514.

Elements of 3D surface calibrator 504 can be implemented using hardware, software, and/or a combination of hardware and software in accordance with embodiments of the present disclosure. For example, in an embodiment, controller 506 is implemented using an algorithm executing on a host computer, and processor 508 and memory 510 are part of the hardware of the host computer. The host computer can be a general purpose computer or a special purpose computer for calibrating 3D object files. In an embodiment, 3D surface calibrator 504 is implemented using one or more special purpose devices, and processor 508 and memory 510 are implemented into the one or more special purpose devices.

Elements of 3D surface calibrator 504 and/or 3D printer 514 can be implemented using a single device or multiple devices in accordance with embodiments of the present disclosure. For example, in an embodiment, controller 506 is implemented using an algorithm executing on a host computer, and the host computer sends calibrated 3D object file 512 to 3D printer 514. In an embodiment, 3D surface calibrator 504 and 3D printer 514 are implemented using one or more special purpose devices. In an embodiment, 3D surface calibrator 504 is integrated into 3D printer 514, and both 3D surface calibrator 504 and 3D printer 514 are implemented using a single device.

Elements of 3D surface calibrator 504 can be implemented using a variety of 3D manufacturing processes. For example, while 3D surface calibrator 504 has been discussed above as working with a stereolithographic printer, 3D surface calibrator 504 can work with a variety of 3D manufacturing processes that use additive surface deposits. For example, in an embodiment, 3D printer 514 can be a stereolithographic 3D printer or another device that uses additive surface deposits to create a 3D object, including 3D filament printers.

In an embodiment, each direction could be calibrated for independently. In an embodiment, a width (and depth) deposit can be associated with a manufacturing tool, and an algorithm in accordance with an embodiment of the present disclosure can account for this width and depth. For example, in an embodiment, 1 millimeter could be removed in the z-direction, and 2.5 millimeter could be removed in the x and y directions. In an embodiment, to get these measurements, a calibration target could be manufactured and measured.

4. Exemplary Methods for Calibrating Surfaces of a 3D Object

Figure 6:
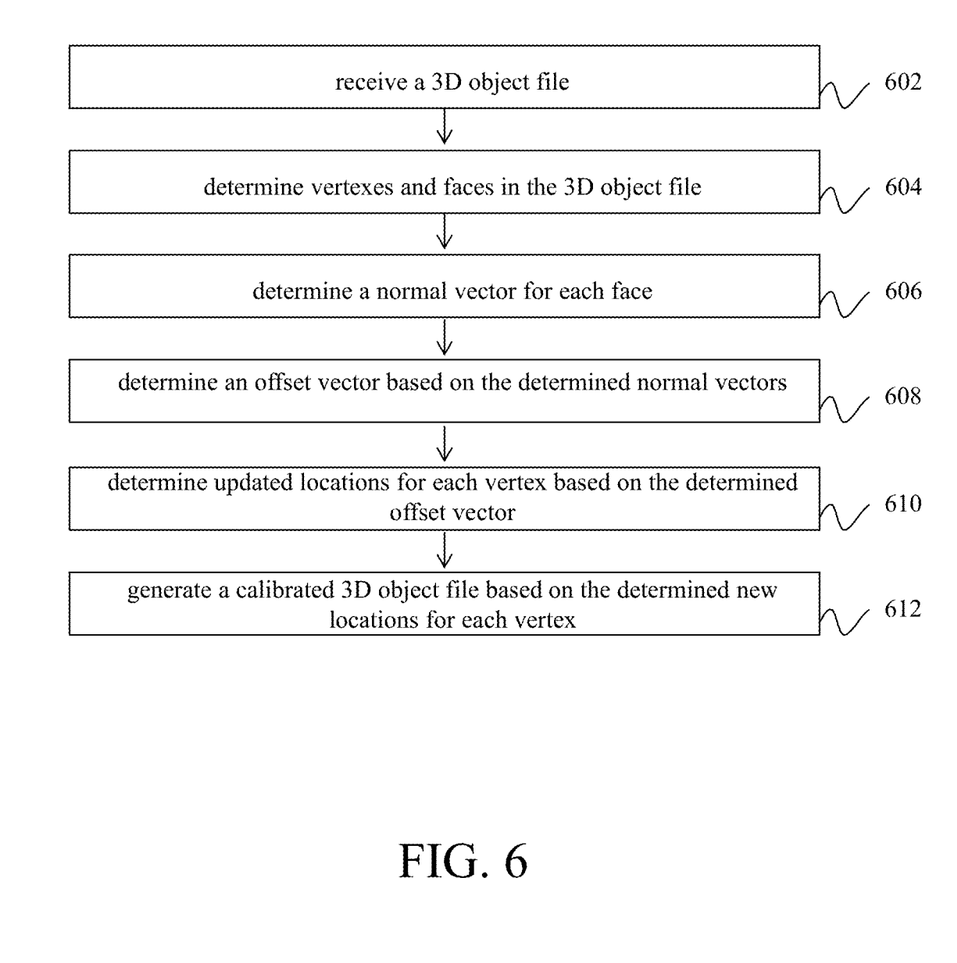
FIG. 6 is a diagram of an exemplary method for calibrating surfaces of a 3D object in accordance with an embodiment of the present disclosure.

FIG. 6 is a diagram of an exemplary method for calibrating surfaces of a 3D object in accordance with an embodiment of the present disclosure. In step 602, a 3D object file is received. For example, in an embodiment, controller 506 of 3D surface calibrator 504 receives 3D object file 502. In step 604, vertexes and faces in the 3D object file are determined. For example, in an embodiment, controller 506 reads 3D object file 502, which contains vertexes and faces for a 3D object. In an embodiment, the faces form surfaces (e.g., triangular surfaces) formed by connecting vertexes. While triangular surfaces are discussed herein, it should be understood that other polygonal shapes for faces are possible in accordance with embodiments of the present disclosure. In step 606, a normal vector for each face is determined. For example, in an embodiment, controller 506 determines a normal vector for each face by using the right-hand rule establishing an 'up' vector for each surface in 3D object file 502.

In step 608, an offset vector is determined based on the determined normal vectors. For example, in an embodiment, controller 506 can determine the offset to be applied based on the normal vector using a variety of methods, as discussed above. In an embodiment, controller 506 can average together all of the determined normal vectors and can multiply them by an offset scalar value to create an offset vector. In an embodiment, this scalar value is a known value (e.g., half the beamwidth of laser 516). As discussed above, the offset scalar value can also be input by a user, sensed from 3D printer 514, determined based on printed 3D object(s) 518, etc.

In step 610, updated locations for each vertex are determined based on the determined offset vector. For example, in an embodiment, controller 506 determines updated locations for each vertex by adding the offset vector to each vertex. In step 612, a calibrated 3D object file is generated based on the determined updated locations for each vertex. For example, in an embodiment, controller 506 generates calibrated 3D object file 312 using the updated locations for each vertex and sends calibrated 3D object file to 3D printer 514, which creates printed 3D object 518.

5. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A system for printing three-dimensional (3D) objects, the system comprising:
    a 3D printer, comprising a laser, wherein the 3D printer is configured to print, using the laser, a 3D object using a calibrated 3D object file; and
    a 3D surface calibrator configured to:
        receive a 3D object file,
        determine a plurality of vertexes and a plurality of faces in the 3D object file,
        determine a plurality of normal vectors, wherein each normal vector in the plurality of normal vectors corresponds to a respective face in the plurality of faces,
        average the normal vectors,
        multiply the averaged normal vectors by a predetermined offset scalar value determined based on the beamwidth of the laser used to print the 3D object, thereby generating an offset vector,
        determine updated locations for each vertex in the plurality of vertexes based on the determined offset vector, and
        generate the calibrated 3D object file based on the determined updated locations for each vertex in the plurality of vertexes.

2. The system of claim 1, wherein the offset scalar value is half of the beamwidth of the laser.

3. The system of claim 1, wherein the 3D surface calibrator is further configured to:
    add the offset vector to locations of each vertex in the plurality of vertexes, thereby generating the updated locations for each vertex in the plurality of vertexes.

4. The system of claim 1, wherein the 3D surface calibrator is further configured to determine the offset vector based on a previously printed 3D object generated by the 3D printer.

5. The system of claim 1, wherein the 3D surface calibrator further comprises:
    a 3D object sensor, wherein the 3D object sensor is configured to sense information from the 3D object, and wherein the 3D surface calibrator is further configured to determine the offset vector based on the sensed information from the 3D object.

6. A 3D surface calibrator for generating a calibrated three-dimensional (3D) object file of a 3D object to be printed, the 3D surface calibrator comprising:
- a memory;
- a processor; and
- a controller, configured to:
  - receive a 3D object file,
  - determine a plurality of vertexes and a plurality of faces in the 3D object file,
  - determine a plurality of normal vectors, wherein each normal vector in the plurality of normal vectors corresponds to a respective face in the plurality of faces,
  - average the normal vectors,
  - multiply the averaged normal vectors by a predetermined offset scalar value determined based on the beamwidth of a laser of a 3D printer used to print the 3D object, thereby generating an offset vector,
  - determine updated locations for each vertex in the plurality of vertexes based on the determined offset vector, and
  - generate the calibrated 3D object file based on the determined updated locations for each vertex in the plurality of vertexes.

7. The 3D surface calibrator of claim 6, wherein the controller is further configured to:
send the calibrated 3D object file to the 3D printer configured to print the 3D object.

8. The 3D surface calibrator of claim 6, wherein the offset scalar value is half of the beamwidth of the laser.

9. The 3D surface calibrator of claim 6, wherein the controller is further configured to:
add the offset vector to locations of each vertex in the plurality of vertexes, thereby generating the updated locations for each vertex in the plurality of vertexes.

10. The 3D surface calibrator of claim 6, wherein the controller is further configured to determine the offset vector based on a previously printed 3D object generated by a 3D printer used to print the 3D object.

11. The 3D surface calibrator of claim 6, wherein the controller further comprises:
a 3D object sensor, wherein the 3D object sensor is configured to sense information from the 3D object, and wherein the controller is further configured to determine the offset vector based on the sensed information from the 3D object.

12. The 3D surface calibrator of claim 11, wherein the 3D object sensor is further configured to sense information from respective printed 3D objects in a plurality of printed 3D objects, and wherein the controller is further configured to continually update the offset vector based on the sensed information from the respective printed 3D objects in the plurality of printed 3D objects.

13. A method for calibrating a three-dimensional (3D) object file of a 3D object to be printed, the method comprising:
- receiving, using a processing device, the 3D object file;
- determining, using the processing device, a plurality of vertexes and a plurality of faces in the 3D object file;
- determining, using the processing device, a plurality of normal vectors, wherein each normal vector in the plurality of normal vectors corresponds to a respective face in the plurality of faces;
- averaging, using the processing device, the normal vectors,
- multiplying, using the processing device, the averaged normal vectors by a predetermined offset scalar value determined based on a beamwidth of a laser of a 3D printer used to print the 3D object, thereby generating an offset vector,
- determining, using the processing device, updated locations for each vertex in the plurality of vertexes based on the determined offset vector; and
- generating, using the processing device, a calibrated 3D object file based on the determined updated locations for each vertex in the plurality of vertexes.

14. The method of claim 13, further comprising:
printing the 3D object using the calibrated 3D object file.

15. The method of claim 13, wherein the offset scalar value is half of the beamwidth of the laser used to print the 3D object.

16. The method of claim 13, wherein determining updated locations for each vertex in the plurality of vertexes further comprises:
adding the offset vector to locations of each vertex in the plurality of vertexes, thereby generating the updated locations for each vertex in the plurality of vertexes.

17. The method of claim 13, further comprising:
generating the offset vector based on a previously printed 3D object generated by the 3D printer.

18. The method of claim 13, further comprising:
sensing information from the 3D object using a 3D object sensor.

19. The method of claim 18, further comprising:
generating the offset vector based on the sensed information.

20. The method of claim 18, further comprising:
sensing information from respective printed 3D objects in a plurality of printed 3D objects; and
continually updating the offset vector based on the sensed information from the respective printed 3D objects in the plurality of printed 3D objects.

* * * * *